United States Patent [19]

Absolon et al.

[11] 4,190,456

[45] Feb. 26, 1980

[54] CEMENTITIOUS COMPOSITION CONTAINING ASBESTOS FIBRES AND PREPARED USING A SURFACTANT

[75] Inventors: Victor J. Absolon, Plaisir, France; George T. Hurst, Newport, Australia; John C. Worboys, Doncaster, Australia; George H. Barnett, North Balwyn, Australia; Ross P. Dickson, Oakleigh, Australia

[73] Assignee: ICI Australia Limited, Melbourne, Australia

[21] Appl. No.: 919,548

[22] Filed: Jun. 27, 1978

[30] Foreign Application Priority Data

Jul. 1, 1977 [AU] Australia ............................. 0679/77
Jul. 1, 1977 [AU] Australia ............................. 0680/77
Jul. 1, 1977 [AU] Australia ............................. 0681/77

[51] Int. Cl.² ............................................. C04B 31/08
[52] U.S. Cl. ...................................................... 106/99
[58] Field of Search ................... 106/99; 162/153, 154, 162/155

[56] References Cited

U.S. PATENT DOCUMENTS

| | | | |
|---|---|---|---|
| 3,169,878 | 2/1965 | Snyder | 106/99 |
| 3,219,467 | 11/1965 | Redican et al. | 106/99 |
| 3,354,031 | 11/1967 | Kozacik | 106/99 |
| 3,661,603 | 5/1972 | Nicol | 106/99 |
| 3,880,664 | 4/1975 | Schulze | 106/99 |

*Primary Examiner*—James Poer
*Attorney, Agent, or Firm*—Cushman, Darby & Cushman

[57] ABSTRACT

Cementitious compositions containing novel asbestos fibres characterized in that the said asbestos fibres are prepared from asbestos-bearing material by a process comprising treating said asbestos-bearing material with a surfactant to form a dispersion and agglomerating said dispersion.

37 Claims, No Drawings

CEMENTITIOUS COMPOSITION CONTAINING ASBESTOS FIBRES AND PREPARED USING A SURFACTANT

This invention relates to asbestos cementitious compositions, and more particularly it relates to compositions containing novel asbestos fibre.

Asbestos fibres have for some years been employed in a number of common products such as asbestos-cement sheets, panels, and pipe as well as paper and millboard, which are produced by so-called "wet" or "dry" processes that include filtration or percolation-type processes in which a liquid, typically water, is withdrawn from within a mass or body containing asbestos fibres. An example of such manufacturing process is the wet process which conventionally involves the steps of forming an aqueous slurry of asbestos fibres and Portland cement in water, flowing the slurry onto a filter element upon which the dispersed solids of the slurry may be collected, removing water in the slurry through the filter element by filtration, and then removing the formed mass of asbestos fibres and cement from the filter element.

In a conventional dry process used to form asbestos-cement articles, the dry materials such as asbestos, silica, cement and pigment are blended together and formed into batches by weight. Sufficient water is added to each batch to form a plastic paste which can be molded, calendered, pressed or extruded prior to standard asbestos-cement during operations.

Asbestos is a term applied to a number of fibrous mineral silicates which may be divided into two large groups, one of which is known as amphibole which contains as sub-divisions minerals such as anthophyllite, amosite, crocidolite, tremolite or actinolite, and the other which is referred to as serpentine or chrysotile. Chrysotile constitutes the bulk of that used industrially and is to be found as a mineral deposit in many countries such as Canada, United States of America, Italy, South Africa, Russia and Australia. For most deposits the major proportion of the asbestos component is in the form of fibrils which are cylindrical with an outer diameter in the range from 200 to 500 angstroms. The origins of chrysotile are varied. Thus for example in Canada chrysotile originates from such rocks as dunite, peridotite or pyroxenite which have been altered to serpentine by hydrothermal reactions acting upon magnesia-rich minerals, such as olivine, whilst in South Africa chrysotile occurs in sedimentary rocks and is a product of alteration of magnesium limestone.

A consequence of the different circumstances of formation of the chrysotile and its subsequent geological history is that the chrysotile fibres from different sources may have differences in composition or texture, in fibre dimensions or tensile strengths, or in other properties. The usual mode of occurrence of chrysotile is a "cross fibre" arrangement in which bundles of fibres are closely packed together and set at right angles to the walls of cracks and fissures that extend through the host rock of the ore body. To obtain a useful product from the ore requires, firstly, the liberation of the fibrous component and separation from it, as far as economically practicable, of the associated rock particles which detract from the product quality and value, and secondly the fiberising of fibre bundles to give smaller diameter fibres with maximum conservation of fibre length.

Mining of asbestos is often done by trenching or open pit methods, or by underground mining by tunnelling or block-caving methods to provide a crude product which is subjected to a milling treatment.

The ore brought into the mills is subjected to a sequence of steps designed to separate the fibre or fibre bundles from the unwanted rock which is then discarded. In many cases large quantites are milled since only a small percentage of the mined rock consists of recoverable asbestos.

The conventional separation of the asbestos fibres from the rock consists of crushing the rock, passing through vibrating screens, drying, further crushing stages, separation into fibres, sieving, and removal of the fibres by suction. Both crushing steps are multistage, that is after each initial crushing and screening the incompletely broken rock is repetitively crushed and screened until the desired disintegration of the material is complete.

The material in some deposits may comprise relatively short length fibres or may be unusually resistant to fiberising by conventional dry milling practices. As a result the proportion of the potentially available fibre which can be recovered in commercially useful form is reduced substantially and the economic feasibility of processing is adversely affected.

The vigorous breaking and grinding of solid rock masses to release fibre bundles leads to extensive breaking of the longer fibres and consequent economic losses. Many attempts have been made to improve the conventional processes to maximize the production of the longer fibres but these have only been partially successful.

It has been found that for certain deposits the conventional treatment is comparatively ineffective. For example, with certain asbestos-containing deposits such as are found in some areas in Australia, the veins of chrysotile have been converted to a state in which some of the asbestos remains persistently as comparatively large bundles of fibres throughout the processing. Hitherto it has not been advantageous commercially to recover the fibre content of such bundles of spicules in a form which was useful.

Various classification schemes are used to describe the grades of the fibre products from asbestos mills, but that adopted by the Quebec Producers Association is widely recognized. Broadly the classification involves nine groups having decreasing fibre lengths.

Groups 1, 2 and 3 cover various spinning grades used for textile production. Groups 4 to 6 are medium length fibres which are used for asbestos-cement production, the longer grades attracting higher prices. Group 4 is preferred for asbestos-cement production, Group 5 is called the "paper stock grade" and Group 6 is largely limited to paper and shingle production.

Group 7 consists of "shorts and floats", and Groups 8 and 9 are used as sands and gravel.

The greatest part of the asbestos produced throughout the world is consumed in the manufacture of asbestos-cement products. Consequently considerable effort has been expended in trying to develop better methods of recovering the grades suitable for this application.

This is particularly true for areas containing the difficult ore deposits described above. In such cases the commercial dry fiberising operations give yields of only 2-6% w/w (based on mill feed) of fibre of grades suitable for asbestos-cement manufacture.

It is an object of our invention to provide cementitious compositions comprising asbestos fibres from grades not hitherto useable for asbestos cement production.

A disadvantage of all conventional dry crushing processes is that during milling dust is produced in the form of rock and fibre fines in large quantities. Huge baghouse installations have to be employed to provide satisfactory working conditions by reducing dust and recirculating clean filtered air. There has been increasing concern with safeguarding the health of all workers involved in the handling of asbestos fibres. The hazard is not confined to the mining and milling discussed above, but extends to subsequent handling in packing, storing, and shipping. Users of the graded asbestos fibres, in particular asbestos cement manufactures, must also go to considerable trouble and expense to protect their workers.

Workers are regularly examined and x-rayed by medical staff, and a medical history of each worker established. Workmen are provided with suitable dust masks to protect the nasal passages and lungs from inadvertent exposure to dust. These masks require regular inspections and sterilizations. Some workmen are found to be allergic to the dusts and have to be transferred to alternative work.

In asbestos cement manufacture the greatest hazards are associated with the early stages, since the final product and the moistened cementitious compositions provide a greatly reduced hazard. These early stages are a source of hazard because the asbestos cement manufacturer usually receives varying grades and must select and mix these according to his current production needs. Frequently he must carry out preliminary grinding to provide fibre of the right specification for his cementitous compositions.

It is an object of our invention to provide cementitious compositions derived from asbestos fibres that can be handled with a much higher degree of safety. In particular we provide cementitious compositions derived from novel asbestos fibres which can be readily transported, handled, and used in a safe moistened condition, and which require minimal hazardous pre-treatment prior to incorporation into cementitious compositions.

It is a further object is a further object of our invention to provide dust-free pre-treatment processes for modifying our novel asbestos fibres.

Accordingly we provide cementitious compositions characterized in that they contain novel asbestos fibres comprising asbestos fibres and agglomerates of fibres and fibrils which retain a fibrous character and which may have up to 20% w/w of surfactant adsorbed on or adsorbed into the asbestos, but usually contain less than 10% w/w of residual surfactant.

Asbestos cement is formed from essentially a mixture of asbestos fibres, Portland cement, and water. After thorough mixing the product is dewatered by flowing into the filtering bed of a hydraulic press so that a portion of the water can be expressed by filtration through the layer at relatively low pressure and the sheet so formed is subjected to high pressure for final shaping. In place of Portland cement there may be other hydraulic cementitious material, for example, calcium aluminium cements, or for some purposes, plaster.

While the more specific embodiments of this invention are directed to the manufacture of asbestos-cement articles by the filtration of particulate materials from a slurry comprising asbestos fibres and hydraulic cement, it is to be understood that the broader aspects of the invention include the manufacture of a variety of asbestos-containing articles.

An important function of the asbestos fibres in the cementitious compositions is to provide reinforcement. This reinforcement is measured, for example, as flexural strength and impact strength. Also of importance to the asbestos cement manufacturer is the "green strength" of the cementitious compositions prior to hardening. Since the reinforcement of the asbestos cement provided by the asbestos fibres is affected by the presence and nature of impurities in the asbestos fibres, the removal of these impurities can thus increase greatly the cost and complexity for the pre-treatment of the fibres before forming the cementitious compositions.

It is an advantage of our invention that the novel asbestos fibres provide very good reinforcement in cementitious compositions. It is a further advantage of our invention that we provide a convenient pre-treatment of the fibres to remove any residual grit.

The cementitious compositions of our invention may be prepared in two stages which may if desired be at separate sites. In the first stage the novel asbestos fibres of our invention are obtained from the chosen asbestos-bearing material; in the second stage the said compositions are prepared from the novel fibres in conventional or existing asbestos-cement manufacturing equipment. Alternatively the novel fibres may be prepared as a first step in a continuous sequence leading to the desired cementitious compositions. Treatments modifying the characteristics of the fibres may also be incorporated.

We will now describe in more detail these various embodiments of our invention.

The wide variety of asbestos-bearing materials that may be treated by the process described below to give good yields of the novel fibres of our compositions includes raw ore, partially classified mill feed, tailings from conventional processes, and fibre concentrates from either wet or dry processes.

The actual sequence of operations, and the number of auxilliary steps for any particular asbestos-bearing material, is determined by the necessity to liberate fibre from non-fibrous particles, or to separate from the product, at various convenient stages, the grit, dust, unopened fibres or other material which would lower the performance of the final compositions below the desired level.

Where the process is used to treat crude chrysotile ore for example, the process will typically comprise the following steps:
(1) a crushing step to convert the asbestos-bearing material to mill feed,
(2) a wet screening and gravity separation step to remove large grit (typically larger than 10 mesh) containing little asbestos,
(3) a wet grinding or crushing step to liberate and partially open the asbestos fibre bundles,
(4) a first classification step to produce a fibrous concentrate from which particles of non-fibrous components have been substantially removed,
(5) a dewatering step,
(6) a contacting step where the partially-opened fibre bundles are treated with a suitable chemical agent,
(7) a fiberising step,
(8) a dilution step, to reduce slurry viscosity sufficiently for further classification,
(9) a second classification step to further remove unwanted grit,

(10) a slurry dilution step to induce coagulation of fibres and form stringy fibre agglomerates,

(11) a third classification step to remove residual particles of unfiberised materials and some of the shortest fibres, if required, and

(12) a dewatering step.

When the raw material for the process is mined ore, the initial crushing (1) is that normally used for the conventional dry crushing of asbestos-containing rock. Typically this is carried out in a jaw crusher or a cone crusher and the asbestos-bearing material may be moistened to reduce dust formation at this stage also. The feed is selected by passing through a screen, and this is typically of $-\frac{3}{8}$ inch mesh.

This feed may then be subjected to wet screening (2) to remove the bulk of the coarse material above the desired size. This coarse material is then subjected to a gravity separation involving, for example, panning, wet shaking tables, or other classifiers. A small percentage of desired asbestos fibres is recovered at this stage and is returned for treatment in subsequent steps of the process; the coarse nonfibrous waste is discarded.

The fibre-containing solids are subjected to a wet grinding step (3). This can be carried out conveniently in rod mills or ball mills and in practice it may be advantageous to have more than one stage of grinding with the same or different types of grinding equipment in sequence with a corresponding number of stages of particle classification (4). The solids content of the slurry during grinding is typically 20 to 70% by weight.

In one embodiment of our invention a dilute solution of the chemical agent is introduced during the wet grinding step (3). The chemical agent introduced at this stage will usually be the one to be used in the subsequent stage of fiberising. While the solution of the chemical agent can be specifically prepared for this step (3), it is an advantageous feature of our invention that it is possible to recycle to this stage process solution containing excess chemical agent separated from the fibre product at a later stage of the process.

This is a practical convenience in avoiding the need to dispose of solutions, reducing chemical agent and water usage, and thus is of considerable economic value.

The purpose of this stage (3) is not to produce a high degree of fiberisation, but rather to give a slight "fluffing" of the fibres to accentuate the apparent density differentiation of the fibres and the rock so that the separation in the following classification stage is facilitated. In this process it is also possible to achieve efficient liberation of fibre from the non-fibrous components in the mill feed with a minimum reduction of fibre length by breakage.

The aqueous slurry of solids from this milling stage (3) is subjected to a first classification (4) for the purpose of producing a fibre concentrate for subsequent chemical treatment, by removing non-fibrous particles from the main process stream. The purpose of this step is to maximise both the retention of fibre and the elimination of gangue. The latter not only degrades the product quality but can decrease plant capacity and increase chemical agent consumption if left in the circuit during subsequent steps.

This classification step (4) may involve sequential use of several similar or different types of hydraulic classifiers in order to achieve the optimum s paration of components for a particular ore. The coarsest particles may be first separated by wet screening or by use of slime/sand separators such as spiral, bowl, or hydraulic cone classifiers, and then subjected to further treatment, such as a wet shaking table or hydrocyclone, to recover fibre-containing particles from this stream.

The stream carrying the smaller particles is subjected similarly to further stages of hydraulic classification, using, for example, hydrocyclones. The fibre-containing solids fractions so separated may be accumulated as a single fibre concentrate or presented separately to the subsequent steps of the process whereby the best process conditions may be selected more readily to achieve optimum yield and quality offproduct.

In order to maintain suitable control of water flows throughout the process circuit, or to isolate various soluble or insoluble components to particular sections, the bulk of the water from the fibre containing fractions may be separated (5) using basket or bowl type centrifuges or other filtration devices. This water is available for recycle.

In a further embodiment of our process the fibre-containing fractions from the classification step (4) may be mixed prior to the dewatering step (5) with process solutions containing chemical agent, recycled from a later stage in the process (12). The adsorption of the chemical agent on the fibrous solids provides a convenient way of recycling and re-using some of the agent.

The opening of the fibre bundles to produce fibres, in the presence of a selected solution of chemical agent may be carried out in two distinct stages, i.e., contacting (6) and fiberising (7), or these stages may be essentially combined so that they are concurrent and the time of contacting is comparatively short. The choice of conditions for stages (6) and (7) is a matter of experiment and depends substantially on the nature of the asbestos-bearing raw material entering the process.

In the contacting step (6) the fibrous solid from the classification stage is suspended in a solution containing the appropriate amounts of the chemical agents referred to hereinafter, the quantities of solids, chemicals agents and water being selected according to the degree of fiberisation required and viscosity of the resultant slurry. This slurry is optionally allowed to stand quiescent or with gentle agitation for a period of time to facilitate wetting and penetration of the solids by the solutions and to promote incipient fiberising. The optimum period of time is established by core laboratory experiments for the particular crude ore. The slurry is then subjected in the fiberising step (7) to the action of a suitable device providing sufficient energy to the system to separate the fibre bundles into smaller diameter fibres or fibrils with minimum shortening of length. This can be done, for example, by means of a ball mill, high speed macerator, colloid mill, or ultrasonic disintegrator.

In a preferred embodiment the contacting step (6) is carried out at elevated temperatures. For example, at 90° C. the time required for fiberising the solids is significantly reduced and less severe application of mechanical energy is required, which is beneficial to retaining length in the resultant fibres. Temperatures above 100° C. can be employed using an autoclave at elevated pressures. The upper limit for the temperature is near 400° C. since above this the chrysotile begins to decompose water. In practice the selection of the best temperature/time conditions is largely an economic consideration for any particular ore. The elevated temperature conditions can also be maintained during the fiberising step with advantage.

The ratio by weight of water to solids in the contacting stage is in the range 1:2 to 20:1, preferably in the range 3:2 to 6:1. According to the nature of the fibre concentrate being treated and the type of fiberising device being used, additional water or recycled process solution may be added in the fiberising step. The necessity to pump slurries from one process stage to another can put practical limits on the viscosity which can be tolerated.

The chemical agents added in the contacting stage (6) for promoting the fiberising (7) of the chrysotile may be ionic or nonionic in character or mixtures of the two types. They are characterised in that they react with or are adsorbed on the surface of asbestos fibres and consequently facilitate the opening of the fibres under the influence of the mechanical fiberising devices, and maintain the fibres in stable dispersion. The initial concentration of the chemical agents in the water is more than 0.01% w/w and preferbly more than 1% in the contacting stage and preferably also in the fiberising stage. Incremental additions of the chemical agents can be made during these stages to maintain or increase the concentration.

Preferably the chemical agents are surfactants, and are selected from the classes of anionic, cationic, non-ionic, and amphoteric surfactants. We have found that ionic surfactants or mixtures containing them are particularly useful. The most preferred surfactants are of the anionic type and mixtures of anionic and non-ionic types. Where mixtures of surfactants are used they may be added together in the processing or added in sequence when this is beneficial to either the fiberising, the subsequent coagulation, or the properties of the final product. In the latter case, for example, the mixture of surfactants may be chosen to facilitate the redispersion of the fibres in making cementitious compositions such as asbestos cement.

In the case of the preferred surfactants, some of the surfactant remains strongly adsorbed even after extensive dilution of the fiberising dispersion.

The concentration and conditions required for optimum fiberising vary according to both the nature of the surfactant and of the chrysotile. Because of its effects on the surface charge of the chrysotile, the pH of the solution influences the surfactant adsorption. Amphoteric types of surfactants may display either anionic or cationic character according to the pH of the system. Mixtures of surfactants of the same type, for example, anionic, can be beneficial in optimising the overall process, but may tend to complicate aspects of reagent recycle.

The surfactant or surfactants for our process may be selected from among the following groups of anionic surfactants: carboxylates, N-acylsarcosinates, alkanesulphonates, linear and branched alkylarylsulphonates, dialkyl sulphosuccinates, arylsulphonates, naphthalenesulphonates, N-acyl-N-alkyl-laurates, 2-sulphoethyl esters of fatty acids, olefin sulphonates, alyl sulphates, sulphated natural oils, sulphated alkylphenol alkoxylates, and phosphate esters of alkanols and phenol and alkylphenol alkoxylates.

The carboxylates, sulphates, sulphonates, and phosphates may be in any of the derivative forms known to those skilled in the art, as for example, the free acid, metal salts such as the magnesium and sodium salts, ammonium and substituted ammonium salts, and esters. Typical substituted ammonium salts are those derived from mono-; di- and triethanolamine. We prefer to use the sodium salts since they are readily available and generally are convenient to use because they have good water solubility.

The preferred anionic surfactants are those with long chain alkyl groups such as, for example, nonyl, decyl dodecyl, tridecyl, stearyl, cetyl, palmityl and myristyl.

Thus typical carboxylates that give good results with our process are sodium oleate and sodium laurate. Preferred N-acylsarcosinates are those with the acyl group selected from the group consisting of cocoyl, lauroyl, stearoyl and tall oil acyl.

Typical examples of suitable sulphates and sulphonates are ammonium lauryl sulphate, diethanolamine lauryl sulphate, sodium cetyl sulphate, dodecylbenzenesulphonic acid, sodium dodecylbenzenesulphonate, triethanolamine dodecylbenzene sulphonate, tridecylbenzenesulphonic acid, nonylnaphthalenesulphonic acid, sodium butylnaphthalenesulphonate, sodium tetrahydronaphthalenesulphonate, and α-olefin sulphonate.

The most preferred sulphonates are those derived from sulphosuccinic acid. They are conveniently used in the form of sodium salts of the esterified acids. Specific members of this group that we have found very useful are sodium dihexyl sulphosuccinate, sodium di(isobutyl)sulphosuccinate, sodium dioctyl sulphosuccinate, disodium N-octadecylsulphosuccinamate, tetrasodium N-(1,2-dicarbethoxyethyl)-N-octadecyl sulphosuccinamate, and the sodium sulphosuccinate esters of lauric mono- and di-ethanolamides or of ethoxylated lauryl or decyl alcohols.

Suitable phosphate esters include "Teric" 305 and 306 (alkyl ester phosphates; "Teric" is a Registered Trade Mark).

Suitable cationic surfactants comprise the mono-, di-, and polyamines, amine oxides, alkoxylates of alkyl and alicyclic amines, 2-alkyl-1-(hydroxyethyl)-2-imidazolines, tetrakis-substituted ethylenediamines, amide-linked amines, and quaternary ammonium salts. The amine oxides are of the general formula.

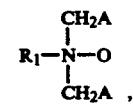

wherein A is hydrogen or hydroxyl, and $R_1$ is selected from the group consisting of cetyl, lauryl, myristyl, stearyl, coco, decyl, hexadecyl and octadecyl.

The amide-linked amines are of the general formula

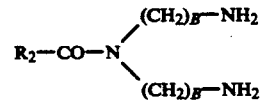

wherein $R_2$—CO—N is derived from the group consisting of coconut, oleic, stearic, and tall oil acids, and B is 2 or 3.

The quaternary ammonium salts are of the general formula

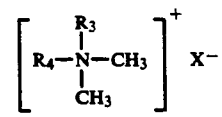

wherein $R_3$ and $R_4$, which may be the same or different, are selected from the group consisting of methyl, benzyl, tallow, stearyl, cetyl, lauryl, and myristyl, dodecylphenyl, and stearyl, and X is bromide, chloride, methanesulphonate, or toluene-sulphonate.

The dialkylpyridinium salts comprise compounds of the general formula

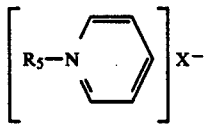

wherein $R_5$ is cetyl or lauryl, and X is as hereinbefore defined.

Cationic surfactants which we have found particularly useful include "Cetrimide" (cetyltrimethylammonium bromide), "Vantoc" CL (lauryl-dimethyl benzylammonium chloride), "Monoflor" 71, and "Fixinol" (cetyl pyridinium bromide). "Cetrimide", "Vantoc", "Monofluor" and "Fixinol" are Registered Trade Marks.

Suitable non-ionic surfactants for the process of our invention may be selected from among fatty acid esters, alkoxylated aliphatic alcohols and alkylphenols, alkoxylates fatty acids and fatty acid amides, and natural fats and oils.

Preferred aliphatic alcohols are selected from the group consisting of ethylene glycol, propylene glycol, glycerol, oleyl alcohol, lauryl alcohol, cetyl alcohol, stearyl alcohol, tridecyl alcohol, myristyl alcohol, trimethylnonyl alcohol, primary $C_{12}$–$C_{13}$ and $C_{12}$–$C_{15}$ alcohols, secondary $C_{11}$–$C_{15}$ alcohols, tallow, and sorbitan, and preferred alkylphenols are selected from the group consisting of nonylphenol, dodecylphenol, octylphenol, isooctylphenol, and $C_8$–$C_{12}$-alkyl-phenols. The preferred fatty acids are lauric acid, stearic acid, oleic acid, coco acid, capric acid and myristic acid.

The carboxylic esters are those prepared from carboxylic acids selected from the group consisting of lauric acid, stearic acid, oleic acid, coco acid, palmitic acid, ricinoleic acid, tall oil, soybean oil, rosin, tallow, lard, cottonseed, and safflower oil, and from alcohols selected from the group consisting of glycerol, sorbitan, ethylene glycol, diethylene glycol, propanediol, and poly(oxyethylene).

We prefer that the alkoxylates be ethoxylates which contain from 1 to 50 ethyleneoxy (—$CH_2CH_2$—O—) units per molecule. The amines used to prepare the fatty acid amides are selected from the group consisting of ethanolamine, diethanolamine, and isopropanolamine.

Non-ionic surfactants which we have found particularly useful include the glycol ester of oleic and lauric acid, ethoxylated nonyl phenols, polyethyleneglycol methacrylate, and "Teric" 9A8 (an ethoxylated aliphatic alcohol; "Teric" is a Registered Trade Mark).

Suitable amphoteric surfactants are substituted aminoacids, such as N-coco-3-aminopropionic acid disodium N-lauryl-3-iminodipropionate, N-carboxymethyl-N-cocoalkyl-N,N,dimethylammonium hydroxide, the sodium salt of N-hydroxyethyl-N-lauromido-β-alanine, and substituted 2-imidazolinium hydroxides.

Other chemical agents that may be used for the process of our invention include tannin, dextrin, alkanoic acids, and lignosulphates such as sodium lignin sulphonate and calcium lignosulphate. The latter are closely related to the sulphonates surfactants described hereinbefore, but are not usually considered "surfactants" by those skilled in the art.

During the fiberising step (7) there is a further opportunity for the disengagement of fibrous particles from non-fibrous particles. Consequently, a second classification step (9) can be used with advantage to remove the non-fibrous particles or unopened fibre bundles from the circuit. Hydrocyclones are convenient devices for effecting this separation. It is necessary that the viscosity of the slurry of dispersed fibre from the fiberising step should be adjusted to a level enabling efficient functioning of pumps and classifying devices. This is carried out in a dilution step (8), the effectiveness of which is assisted by maintaining the concentration of the fiberising surfactant at a level which will not allow significant coagulation of the dispersed fibre. This concentration limit will depend on the particular surfactant or combination of surfactants used for fiberising and dispersing, but is approximately of the same magnitude as the critical micellar concentration for that surfactant or combination of surfactants, under the prevailing conditions of temperature and solution composition.

The dispersed fibres in the suspension are caused to coagulate (10) in the form of stringy agglomerates.

Although the structure of these stringy agglomerates is not known in detail, we have found that they have properties which make them useful for reinforcing cementitious compositions. Furthermore, fibre which is normally unsuitable for reinforcement of cementitious compositions because of the short length or low aspect ratio, when converted to stringy agglomerates by the process of our invention is unexpectedly found to have the desired reinforcement properties. While we do not wish to be limited to the following explanation, we consider that the treatment with surfactant and subsequent coagulation provides a bonding of fibres and fibrils into the novel composite fibres of useful dimensions which are the subject of our invention.

If our process is not followed carefully, that is if arbitrary or inappropriate dilution sequences or coagulation conditions are used, the resultant fibre clumps produced will be small and roughly equidimentional instead of stringy agglomerates. These fibre clumps do not give the maximum reinforcement to fibre-containing articles when incorporated into cementitious compositions. The preferred and optimum conditions for forming the stringy agglomerates are discussed below.

The coagulation of the dispersed fibres to form stringy agglomerates can be induced by several means, according to the nature of the surfactant used for fiberising; for example, by heating, adding organic polyelectrolyte flocculent, changing pH or contacting with a solution of polyvalent cations.

In a preferred embodiment using the preferred types of anionic surfactants for fiberising and dispersing the chrysotile asbestos, it is found effective and convenient to bring about coagulation of the dispersed fibres into stringy agglomerates by extensive dilution of of the fibre suspension by addition to water or to dilute aqueous solutions derived from recycled process streams, but which are essentially surfactant free.

Such dilute aqueous solutions may be obtained or prepared for use in several ways. Where the process solutions recovered after the second (9) and/or third (11) classifying steps are recycled to the earlier stages (3) and (4) as described hereinbefore, much or most of the surfactant will be adsorbed on the fibrous solids of those stages, and the recovered solution will usually be sufficiently free of surfactant to be used directly in the coagulation step. Alternatively, any or all of the recovered process solutions containing surfactant can be diluted to the necessary degree with water. In yet another alternative, the process solutions containing surfactant may be transferred to storage tanks and ponds so that biological degradation of the surfactant may occur, thus reducing the concentration of surfactant to the level desired for re-use of the solution in the coagulation stage.

In one embodiment of the process of our invention the surfactants used in the fiberising step are chosen from among those surfactants that are known to biodegrade readily. Considerable research has been devoted to the development of biodegradable surfactants in recent years to avoid environmental contamination, particularly by selection of the appropriate chain length and branching of the alkyl groups. The surfactants with high biodegradability are well known to those skilled in the art of surfactants.

The coagulation of the fiberised dispersion can be effected in several ways. The dispersed slurry can be poured in a thin stream or pumped through jets into a large volume of water which is stirred gently with a circular motion. An alternative is to bring together in the correct volume ratios the streams of fibre slurry and diluting water by pumping both through a pipe, for example.

In a preferred embodiment, the coagulation to stringy agglomerates is effectively brought about by transferring viscous fibre dispersion onto a 200 mesh screen into a zone covered by many fine jets of diluting water under pressure, thus providing the desired dilution ratio. By this method some removal of undesirably small particles can be achieved simultaneously. The coagulated stringy agglomerates remains on the screen.

The extent of dilution required is dependent in part on the concentration of surfactant in solution in the fiberised dispersion. In practice, it is desirable to keep to a minimum the amount of dilution required and the excess of surfactant used in fiberising. During the dilution additional surfactant enters the solution by desorption from the fibre surfaces. The preferred conditions of dilution for the production of the stringy agglomerates of our process are that they will give solids to water ratios in the range of 1:20 to 1:1500, preferably in the range of 1:70 to 1:400 and surfactant concentrations in the solution from 0.01 to 0.1% w/w.

Fibre clumps are likely to form if the dispersed fibre slurry, or more particularly the partly-diluted but non-coagulated slurry is allowed to stand for long periods. If this does occur the dispersed slurry can be re-constituted by the addition of further surfactant. The amount of additional surfactant required depends on the degree of dilution and clumping, and may be readily established by laboratory experiments. Alternatively, surfactant can be added portion-wise with gentle stirring or agitation until a suitable dispersed slurry is obtained.

After coagulation it is convenient to further refine the fibre product in a third classification step (1) by removing residual dust, grit or other particles which can degrade the product quality. This classification can be carried out using hydrocyclones, for example.

The product is collected by dewatering (12) the slurry of coagulated fibre. This step may be carried out in one or more stages; for example, by vacuum or centrifuge filtration. With particular surfactants the solid will be sufficiently aerophilic to be separated by froth flotations. Indeed, the dewatering may be associated with the third classification step; for example, by employing a solid bowl centrifuge to recover product while allowing unwanted particles to pass out with the effluent solution; similarly a screen may be used as the first collection device for recovering the solid product. Additional dewatering can be achieved using a pressure filter, for example, according to the tolerable water content in the product. The wet asbestos product can be packed and transported as such to users, such as asbestos cement manufacturers.

It can be readily formed into pellets, sheets or other forms convenient for handling. The wet product reduces the dust hazard normally associated with the handling of dry fibre both at the producer and user plants. However, if the dry product is required, the remaining water can be readily removed by heating.

The fiberising surfactant is ultimately distributed in several streams; the fibre product itself contains residual surfactant, the various solids wastes each remove a proportion of the surfactant, and the process solution separated from the fibre contains a substantial fraction of the input surfactant. For economic and environmental reasons it is desirable to recover at least part of the surfactant from the process solutions before discarding them to waste.

Depending on the selection of surfactant for fiberising, it may be necessary to limit the accumulation of electrolytes or other solutes in the process solutions by increasing the proportion of water bleed from the circuit or addition of a separate ion exchange or similar water treatment operation.

In the above description water is used as the diluent. Water is preferred because it is usually readily available, inexpensive, safe, does not pose disposal problems, and is an excellent solvent for most of the chemical agents useful in our process. Furthermore it is widely used in cementitious compositions for the same reason, and it is advantageous to use the same solvent in both preparing and isolating the fibres, and in making the cementitious compositions.

However the repeated reference to water and aqueous solutions made throughout this specification is not to be understood as limiting, since other solvents or co-solvents can be used.

When the process is presented with a clean fibre, the required number of steps may be as follows:
  (a) Contacting the asbestos-bearing material with an aqueous solution of a suitable chemical agent to form a slurry.
  (b) Fiberising the solids in the slurry with the aid of a suitable mechanical device.
  (c) Coagulation of the dispersed fibre to form stringy fibre agglomerates.

This sequence can be used to advantage by asbestos cement manufacturers to modify fibre obtained from conventional wet and dry processes. Thus, in one embodiment of our invention we provide cementitious compositions prepared by treating asbestos fibres with the sequence of (a) contacting, fiberising, and coagulating stages as hereinbefore described, (b) incorporation of the auxiliary components of the composition as selected by those skilled in the art, and (c) forming the composition in the desired shape.

In a further embodiment of our invention we provide a process of treating short fibre grades, e.g. tile grades, such as are obtained as a by-product of conventional wet and dry processes. These short fibres are not usable in cementitious compositions where reinforcement properties are required, but can be converted to the useful novel fibres of our invention. This embodiment differs from the preceding one in that a fiberising step is not normally required.

In yet another embodiment of our invention the asbestos fibres are sprayed, preferably in a tumbler, and allowed to stand for a period before preparing the cementitious composition. In this embodiment no dilution/coagulation stage is used, and the amount of water used for the spraying solution is largely determined by that required in the subsequent cementitious composition.

Because of the new nature of our fibres, the ability to reinforce cementitious compositions may not be correctly indicated by some of the conventional tests used to grade asbestos fibres. This reinforcing property can best be evaluated therefore by forming asbestos-cement plaques or sheets in accordance with the standard procedures employed in the industry and measuring the characteristics of this asbestos-cement. The flexural strength is expressed as the modulus of rupture corrected for the density of the asbestos-cement cake.

Suitable asbestos-cement compositions can be prepared using mixtures consisting essentially of the cement and the novel asbestos fibres of our invention. Typically the cement content will constitute between 1 to 5 parts by weight for each part of the novel asbestos fibres.

In order to obtain particular structural properties in the final cementitious products, any of the prior art additives may be incorporated. These additives include silicious materials, for example, sand, powdered silica, and the like, which may typically be used in amounts up to 3 parts by weight per part of the novel asbestos fibres. Other additives suitable for inclusion in our compositions include dyes, pigments, or coloured fibres, such as glass fibres. The amount of colouring material will depend primarily upon the degree of colouring required in the final products.

Other kinds of asbestos fibres, for example those prepared from amosite or chrysotile by conventional wet and dry processes may also be incorporated in the compositions of our invention. The amount of such fibres, relative to the amount of the novel fibres of our invention may depend on economic considerations, as well as the need to preserve the good filtration and green strength characteristics of compositions based on the novel fibres alone. Typically at least half of the total weight of asbestos fibres in the cementitious compositions will be the novel fibres of our invention.

In another embodiment of our invention we provide cementitious compositions comprising alkali-treated asbestos fibres, and processes for preparing the said compositions. For example the novel fibres of our invention may be treated with a solution of an alkaline reagent to modify the hydrophobic/hydrophilic balance of the fibre surfaces to suit the particular requirements of the asbestos user.

The nature of the alkaline reagent is not narrowly critical, and alkali and alkaline earth metal hydroxides may be used. Typically the alkaline reagent is sodium hydroxide and the ratio of sodium hydroxide to the fibre solids content may be selected to remove a desired amount of the adsorbed surfactant, or to modify part or all of the adsorbed surfactant. The quantity of alkaline reagent required for this purpose can be determined by chemical analysis of a solution of the adsorbed surfactant obtained by extraction from a sample of the solid fibres by means of a suitable solvent such as methanol. It is desirable to avoid unnecessary excess of the alkaline reagent. While the alkaline treatment can be carried out at ambient temperatures, the time of the treatment can be advantageously reduced by heating the mixture of asbestos fibres and the solution of alkaline reagent above ambient, but preferably below 100° C. Typically a temperature in the range of 40° to 70° C. is used.

In yet another embodiment of our invention we provide cementitious compositions comprising heat-treated asbestos fibres, and processes for preparing said compositions. The novel fibres of our invention are heated above 100° C. to modify the hydrophobic/hydrophilic balance of the fibre surfaces to that required for the particular cementitious composition. The preferred temperature, and the period of heating depend on the particular surfactants used to prepare the fibre and also the amount of residual surfactant on the fibre, as well as on the desired properties for the cementitious composition. The best conditions can readily be determined by experiment, but the temperature is not allowed to exceed 400° C. to avoid irreversible damage to the chrysotile fibres. We prefer a temperature in the range of 140° to 300° C., preferably in the range of 150° to 200° C.

The novel fibres of our invention are useful in making cementitious compositions for extrusion processes and for hand moulding. Asbestos-cement pipe is usually made by a process wherein a thin sheet of the cementitious composition, typically collected from a dilute aqueous slurry of the components with a filter screen activated by pressure differentials, is accumulated by convolute winding on a rotating mandrel and consolidated thereon to a continuous mass by the application of pressure. Upon completion of the forming operation of accumulation and consolidation to the designed wall thickness and density, the resultant incompletely hydrated or set asbestos-cement cylindrical body comprising the pipe is removed from the forming mandrel normally as promptly as is practical for recovery and return of the mandrel for reuse, whereupon the asbestos-cement product is appropriately cured to complete its hydration.

Removal of the supporting mandrel from the incompletely hydrated or set asbestos-cement cylindrical body, however, frequently results in the product slumping from its original round configuration. This slumping, or "sag" as it is commonly referred to in the industry, to out-of-roundness constitutes a detriment which is especially critical in the manufacture of thin walled, large diameter pipe. The novel fibres of our invention are useful in such pipe-making applications, particularly where the fibres have been heat-modified as described hereinbefore.

The process of our invention is now illustrated by, but by no means limited to, the following examples. All parts and percentages are on a weight basis.

EXAMPLE 1

A sample of $-\frac{3}{8}$ inch mesh mill feed was obtained from the Woodsreef Mine in New South Wales. This sample was representative of mill feed fed to the conventional dry process over a period of 24 hours. The sample had been subjected to a "core laboratory recovery" procedure, which is used routinely at the mine to provide advance estimates of mill recoveries. The results of the core laboratory recovery are tabulated below, together with the actual recoveries on mill feed fed to the mill during that 24 hour period. The percentage recovery is based on the initial weight of mill feed.

| % Fibre Recovery | | | | | | | |
|---|---|---|---|---|---|---|---|
| Actual Mill Grades | | | | To-tal | Core Laboratory Measured Grade | | To-tal |
| C65-80 | C50-80 | C40-80 | C33-80 | | C65-80 | C35-80 | |
| 0.58 | 2.11 | 0.69 | 0.09 | 3.86 | 1.1 | 3.47 | 4.57 |

A further sample of the mill feed was treated by the following procedure.

The mill feed was first wet screened to remove +10 mesh non asbestos-bearing rock so that only potentially productive rock was treated in later stages. The remaining material was mixed with water and then ball milled to partly open the fibre bundles. After filtering to remove the balls classification was carried out by wet panning and fine grit and unbroken spicules removed. The yield of fibre concentrate, calculated on a dry basis after drying a representative portion, was 32.5%.

EXAMPLE 2

The moist fibre concentrate (100 g) of Example 1 was added to a hot (90° C.) aqueous solution (250 ml) containing "Matexil" WA-OT (12.5 mls; 50% sodium dioctylsulphosuccinate) and dodecylbenzenesulphonic acid (DDBSA) (1.25 mls). The mixture was subjected to vigorous shear stirring in a domestic type high speed macerator for two minutes and then diluted by pouring slowly into hot water (30 liters). ("Matexil" is a Registered Trade Mark). The slurry was decanted from the grit that settled on the bottom and filtered to recover the fibres. After drying the fibres weighed 74 g, ie 74% recovery. This is a 24% yield based on the original mill feed.

The quality of the fibre was comparable to that of the C65-80 grade obtained from the conventional dry process at Woodsreef Mine. This comparison was based on the standar Bauer McNett measurement of fibre size distribution and the other relevant parameter, freeness.

| Source of fibre | % Fibre Bauer McNett Screen Size | | | Freeness (secs) |
|---|---|---|---|---|
| | +4 | +14 | −200 | |
| Woodsreef Mine Monthly averages for C65-80 grade | | | | |
| January 1977 | 12.9 | 36.9 | 28.0 | 71.9 |
| February 1977 | 10.6 | 36.0 | 28.2 | 79.4 |
| March 1977 | 13.6 | 36.4 | 28.0 | 102.3 |
| April 1977 | 14.2 | 38.0 | 27.4 | 84.6 |
| Example 2 | 13.6 | 48.8 | 29.6 | 91.0 |

EXAMPLE 3

A cementitious composition of the fibres from Example 2 were prepared as follows. A mixture of water (450 mls), hydrated calcium sulphate (3 g), and calcium hydroxide (2 g), was thoroughly stirred until no more of the solids dissolved and the supernatant removed by filtration. To this supernatant was added 145 g of solids consisting of fibres (9.5%) from Example 2 and a mixture of Portland cement and silica (60:40; 90.5%).

After thorough mixing a cement plaque was prepared by a procedure based on the Standard Test adopted by the Quebec Asbestos Mining Association. Briefly this involved transferring to a mould containing a screen, pressing to remove water, and curing in a humidity cabinet prior to autoclaving at 170° C.

The flexural strength of the cured cementitious composition, expressed as the modulus of rupture corrected for the density of the cement cake, was 206 kg/cm$^2$.

EXAMPLE 4

The procedure of Example 2 was repeated except that no DDBSA was added. The yield of fibre was 20% based on the original mill feed and the test results are shown below.

| Bauer McNett Sizing, % | | |
|---|---|---|
| +4 | +14 | −200 |
| 16.9 | 42.9 | 35.0 |

EXAMPLES 5-11

The mill feed of Example 1 was treated by the procedure below and the weights in grams of "Matexil" WA-OT and DDBSA varied as shown in Table 1.

TABLE 1

| Example | I "Matexil" WA-OT (50% active) | II DDBSA | Ratio of Active constituents, I/II |
|---|---|---|---|
| 5 | 50 | 12.5 | 2:1 |
| 6 | 20 | 2.5 | 4:1 |
| 7 | 1 | 0.25 | 2:1 |
| 8 | 50 | 7 | 3.6:1 |
| 9 | 40 | 5 | 4:1 |
| 10 | 30 | 4 | 3.75:1 |

In each case 1 kg of mill feed and 1 liter of water were placed in a vessel, the solution of surfactants added, and the mixture stood for one hour with intermittent stirring. The mixture was then tumbled briefly (10 min) in a ball mill containing the following ball charge:

| Size (mm) | Number |
|---|---|
| 12 | 47 |
| 19 | 58 |
| 25 | 31 |
| 32 | 6 |

The mixture was classified by wet screening and panning and yields of various fibre sizes are tabled below

TABLE 2

| Mesh size | % Fibre (on mill feed) Example No | | | | | |
|---|---|---|---|---|---|---|
| | 6 | 7 | 8 | 9 | 10 | 11 |
| +7 | 2.2 | | 0.1 | | | |
| +52 | 30.3 | 35.7 | 20.1 | | | |
| Total | 35.0 | 36.0 | 29.3 | 31.0 | 34.1 | 38.1 |

EXAMPLE 11

A sample (100 g) of fibre concentrate was treated with 250 ml of solution containing "Matexil" WA-OT (3%) and sodium dodecylbenzenesulphonate (1.5%) by the procedure described in Example 2. The recovery of dry fibre was 66.5%, which represented a 22.7% yield based on the original mill feed. The flexural strength of standard asbestos cement plaques was 201 kg/cm² at 11.4% fibre content.

EXAMPLE 12

A sample (100 g) of fibre concentrate was treated with 250 ml of solution containing "Matexil" WA-OT (5%) by the procedure described in Example 2. The recovery of dry fibre was 71.1%, which represented a 24.9% yield based on the original mill feed. The flexural strength for standard asbestos cement plaques was 180 kg/cm² at 11.0% fibre content.

EXAMPLES 13-16

The liberation of fibre and separation and classification of fibre concentrates was carried out in a continuous demonstration unit.

Sample quantities of different lots of mill feed from a dry process, crushed to pass a 10 mesh screen, were fed by a screw feeder to either a ball mill or a rod mill, together with water. In each case the effluent slurry was diluted with a further stream of water and the resulting suspension pumped through a first hydrocyclone, the overflow from which was pumped through a second hydrocyclone. The overflow from the second hydrocyclone was pumped to a solid bowl centrifuge in which was collected most of the remaining suspended solids. The solids in the underflows from the hydrocyclones were recovered by filtration. The solid from the underflow from the first hydrocyclone comprised coarse particles of substantially barren rock. The solid from the underflow from the second hydrocyclone was a coarse fibre concentrate. The residue in the centrifuge was a second fibre concentrate comprising particles of small hydraulic radius than those of the first fibre concentrate. Both the fibre concentrates were suitable for feeding to the fiberising stage of the process of the invention.

The preparation of the separated solids fractions from the typical mill feeds obtained from the Woodstreef Mine are shown in Table 3.

TABLE 3

| | | | | Percentage by Weight | | |
|---|---|---|---|---|---|---|
| Example No | Mill Type | Solids Feed Rate kg/min | Water to Mill Liter/min | Dilution Water Liter/min | First Hydrocyclone Underflow | Second Hydrocyclone Underflow | Centrifuge Residue |
| 13e | Ball | 0.6 | 1.0 | 20 | 76 | 17 | 7 |
| 14 | Ball | 0.6 | 1.0 | 20 | 82 | 11 | 7 |
| 15 | Ball | 0.4 | 0.8 | 16 | 80 | 12 | 8 |
| 16 | Rod | 0.5 | 0.8 | 20 | 83 | 11 | 6 |

EXAMPLE 17

The centrifuge residue from Example 13 was tested by the Bauer-McNett sizing method. The results showed: 1.2% +4 mesh, 6.0% +14 mesh, 77.9% −200 mesh.

Asbestos cement plaques made from this fraction and containing 18% fibre showed a flexural strength of 244 1 kg/cm².

EXAMPLES 18-19

Two samples (200 g) of the fibre concentrate from the underflow of Example 16 were mixed with 600 ml of "Matexil" WA-OT solutions of 5% and 3% concentration, respectively, and stirred for 5 minutes. The mixtures were subjected to low pressure for 15 minutes. The mixtures were subjected to low pressure for 15 minutes. The slurries were twice passed through a disc mill. The resultant viscous suspensions were each divided with 2 liters of 0.25% "Matexil" WA-OT and passed through a hydrocyclone system. The hydrocyclone overflows were each diluted into 20 liters of water by passing through a peristaltic pump and then out through a narrow rubber tube moved in a circular motion through the water. The diluted suspensions of stringy fibre agglomerates were each passed through hydrocyclones and the overflows centrifuged to collect the solid products, which were further dewatered by means of a pressure filter. The yields of product, the Bauer-NcNett sizings and the flexural strengths of asbestos cement plaques at 12.5% fibre content are shown in Table 4.

TABLE 4

| Example No | Conc. "Matexil" WA-OT % | Flexural Strength kg/cm² | Yield % | Bauer-McNett Sizing % | | |
|---|---|---|---|---|---|---|
| | | | | +4 | +14 | −200 |
| 18 | 5 | 237 | 23 | 2.6 | 12.4 | 68.9 |
| 19 | 3 | 187 | 19 | 2.0 | 9.9 | 71.2 |

EXAMPLE 20

A sample −⅜ inch.mesh mill feed was obtained from the Yulgilbar Mine in New South Wales. This material was classified by wet gravity separation (panning) to produce a light fibrous fraction.

This fibre concentrate (100 g) was added to an aqueous solution (2.5% active) the nitrate salt of "Teric" 18 M2 (an ethoxylated amine, prepared by the condensation of a $C_{18}$-amine with 2 moles of ethylene oxide). Vigorous shear stirring was applied for two minutes and then the mixture was diluted by pouring into water (25 liters) to produce a finely divided and opened fibre fraction which could be separated by hydrocycloning and filtering to give a cleaned fibre product (80 g).

EXAMPLE 21

The procedure of Example 20 was repeated but with a 0.01% solution of "Alfloc" being present in the diluting water. Long fibre strands were formed which was hydrocloned and filtered to give a product of improved fibre length (80 g).

EXAMPLE 22

The procedure of Example 21 was repeated replacing the nitrate salt of "Teric" 18 M2 by "Teric" 17 DM3 (an ethoxylated amine prepared by the condensation of a $C_{17}$ diamine with 3 moles of ethylene oxide). A similar product was obtained (77 g).

EXAMPLE 23

Samples of 10 g of a mixed fibre concentrate, each comprising 7 g of second hydrocyclone underflow from Example 14 and 3 g of centrifuge residues from Example 16, were contacted with 900 ml portions of "Matexil" WA-OT solutions in a two stage counter current experiment. The mixtures were each stirred vigorously for 20 minutes and filtered between stages. The input solution contained 0.058% "Matexil" WA-OT and the final output solutions during three cycles contained 0.008%, 0.003% and 0.003% "Matexil" WA-OT, respectively. Similarly, the solids leaving the second stage of contacting during the three cycles contained 6.6%, 5.7%, and 5.1% surfactant expressed as "Matexil" WA-OT, respectively. This indicates the effectiveness of fibre concentrates for scavenging "Matexil" WA-OT from dilute solutions.

EXAMPLE 24

A sample of 600 g of Woodsreef mill feed, crushed to pass to 10 mesh screen, was mixed with 60 liters of 0.1% solution of "Matexil" WA-OT. The solid was then separated by centrifuging. The separated solid was mixed with 1200 ml of 5% "Matexil" WA-OT and the resultant slurry was then fiberished in a high speed macerator for 5 minutes. This viscous slurry was diluted with 10 liter of 0.2% "Matexil" WA-OT and then passed through a 25 mesh screen to remove grit and unopened fibre. After further clean up by pumping through a hydrocyclone circuit, the overflow slurry was diluted by running in a thin stream into 150 liters of water with gentle stirring in a circular motion. This enabled the formation of stringy agglomerates. After the agglomerate suspension was passed through a hydrocyclone, the product solids were recovered from the overflow by means of a centrifuge. The centrifuged solids were further dewatered in a pressure filter.

The yield of dry fibre was 14.3% on the mill feed. When made into standard asbestos cement plaques, it developed a flexured strength of 270 kg/cm$^2$ at 14.1% fibre content. The Bauer McNett sizing showed 1.8% +4 mesh, 12.9% +14 mesh and 48.6% -200 mesh.

EXAMPLE 25

A sample (200 g) of a fibre concentrate product from Woodsreef mill feed, by the general procedure of Examples 13 to 16, as the second hydrocyclone underflow, was added to 600 ml of 5% "Matexil" WA-OT and allowed to stand at ambient temperature for 15 minutes. This mixture was treated for a short time in a high speed macerator during which it became very viscous. It was then diluted by adding slowly to 40 liters of water while stirring gently. The suspension of fibrous agglomerates was decanted through a 200 mesh screen and the solids on the screen were washed with a spray of water. This solid product was further dewatered by filtration.

The flexured strength for asbestos cement plaques containing 15.1% fibre was 311 kg/cm$^2$. The Bauer McNett sizing showed 4.8% +4 mesh, 19.0% +14 mesh, 53.6% -200 mesh.

EXAMPLE 26

A sample of 1 kg of Woodsreef mill feed (passing ⅜ inch mesh) was mixed with 1 liter of a solution in water of 4% "Matexil" WA-OT and 0.5% dodecylbenzene sulphonic acid. The mixture was held at 90° C. for 2 hours and then fiberised in a ball mill for 20 minutes. The resultant suspension was diluted with 8 liters of water. The suspended solids were caused to agglomerate, and were simultaneously freed of grit and unopened fibre bundles, by passage of this suspension through a hydrocyclone together with a further 30 liters of water. The product solids were recovered from the overflow by means of a centrifuge.

The yield of dry fibre was 21.3% of the mill feed. The Bauer McNett sizing of the wet product was 6.1% +4 mesh, 17.4% +14 mesh, and 53.6% -200 mesh.

The yield of commercial fibre obtained in the conventional dry processing plant during the 24 hours period represented by the sample of mill feed used in this Example was 3.3%

EXAMPLE 27

A coarse fibre and spicule fraction was separated from a commercial product from the conventional dry process (Group 4T quality) by passing a suspension in water through a suitable hydrocyclone and filtering the solids from the underflow stream.

A sample (50 g) of this fibre concentrate was contacted with 250 ml of a 5% solution in water of "Matexil" WA-OT in an autoclave at 135° C. under pressure for 1 hour. The resultant suspension was fiberised for a short time in a high speed macerator with progressive addition of 1 liter of 0.2% solution of "Matexil" WA-OT during the fiberising stage. The resultant gel-like mixture was diluted with 500 ml of 0.2% solution of "Matexil" WA-OT. This suspension was caused to agglomerate by pumping through a spray nozzle into 60 liters of water. The suspension of fibrous agglomerates was passed through a hydrocyclone which removed 5 g of solids in the underflow. The bulk of the solids in the overflow stream was collected by means of a solid bowl centrifuge.

Tests were carried out for flexural strength of asbestos cement plaques and Bauer-McNett sizing on both the products and the untreated fibre concentrate, with the following results.

| | Flexural Strength kg/cm$^2$ | % Fibre in Plaque | Bauer-McNett Sizing % | | |
|---|---|---|---|---|---|
| | | | +4 | +14 | -200 |
| Treated Product | 304 | 8.5 | 3.9 | 49.3 | 10.0 |
| Untreated Concentrate | 278 | 9.5 | 6.1 | 42.3 | 3.5 |

EXAMPLE 28

A sample of ore representing one blast in an open cut asbestos mine was crushed to pass a 10 mesh screen. This material (300 g) was contacted with a 7.5% solution of "Matexil" WA-OT (600 ml) and the mixture treated in an autoclave under pressure at 135° C. for 1 hour.

After allowing to cool for 1 hour the sample was treated for two minutes in a high speed domestic macerator. The resultant viscous slurry was diluted (10:1 liquid to solids) with 0.2% "Matexil" WA-OT and allowed to stand for approximately 15 minutes. The supernatant was the decanted and the residue washed with 0.2% "Matexil" WA-OT.

The settling and decanting operation was repeated twice. The supernatant dispersions were combined and the fibre content coagulated by pouring slowly with gentle stirring into 30 liters of water. The suspension of stringy agglomerates so formed was pumped through a hydrocyclone and the solids separated from the overflow stream using a solid bowl centrifuge. Some additional solid was recovered by passing the centrifuge overflow through a 200 mesh screen. This was added to the centrifuge residue and further dewatering by filtration.

An 11% yield of fibre was obtained and a standard asbestos cement plaque had a flexural strength of 303 kg/cm$^{-2}$ for a fibre content of 12.5%, the Bauer-McNett size fractions of the product were 9.1% +4 mesh, 29.4% +14 mesh, 41.2% −200 mesh.

EXAMPLE 29

This example illustrates the effect of varying the temperature of the surfactant solution/fibre mixture, and the time of contacting prior to the application of mechanical energy.

Each sample (200 g) of fibre concentrate was mixed with a solution (50 ml) of "Matexil" WA-OT (5%) and DDBSA (0.5%) that had been pre-heated to either 20°, 50°, or 80° C. The mixture was maintained at that temperature for the periods of 10, 60 and 240 minutes, and the appearance of the mixture note and recorded at the end of the period.

The resulting slurry or gel was then subjected to high speed maceration for 1 minute and diluted (liquid to solid, 200:1) by pouring into stirred water). The length of the agglomerated fibres was estimated by visual observation of samples lifted from the suspension on a spatula. The fibre products were classified A, B, C or D, in order of decreasing length. The results are tabled below.

| Temperature (°C.) | Time (mins) | Appearance | Fibre Length |
|---|---|---|---|
| 20 | 10 | Slurry | D |
| 20 | 60 | Slurry | C |
| 20 | 240 | Slurry | C |
| 50 | 10 | Slurry | C |
| 50 | 60 | Gel | C |
| 50 | 240 | Gel | B |
| 80 | 10 | Gel | C |
| 80 | 60 | Gel | B |
| 80 | 240 | Gel | A |

EXAMPLE 30

A sample (100 g) of fibre concentrate (centrifuge residue from Example 13) was contacted at ambient temperature with a solution (250 ml) of "Matexil" WA-OT (5%). The slurry was treated in a domestic high speed macerator for a short time during which an extra 250 ml of water was added and the slurry became very viscous. This viscous slurry was then placed in 25 g batches on a 200 mesh sreen and wet washed using a nozzle, as described in test procedure C-5 of the Quebec Asbestos Mining Association, operating at 20 p.s.i. and held at 4–6 inches above the screen whilst being moved in a circular motion. The retained solids were then dewatered by filtration and gave a yield of 46% of the fibre concentrate, which equals 3.2% of the original mill feed. A standard asbestos cement plaque had a flexural strength of 316 at 12.5% fibre content.

EXAMPLE 31

A sample (200 g) of fibre concentrate (second hydrocyclone underflow of Example 13) was contacted at ambient temperature with a 5% solution of "Matexil" WA-OT (500 ml). The slurry was fiberised by treatment for a short time in a high speed macerator and became very viscous. The gel-like material was transferred to a 200 mesh screen and sprayed with water as in the procedure of Example 30, but for only sufficient time to induce coagulation. The retained solids were then mixed with 20 liters of water and the suspension pumped through a hydrocyclone. The overflow stream was passed through a 200 mesh screen and the retained solids again sprayed with water at 20 lb/sq in., as in the procedure of Example 32. The solids on the screen were further dewatered by filtration.

The yield of dry fibre was 12%, and standard asbestos cement plaques gave a flexural strength of 352 kg/cm$^2$ at fibre content of 12.5%.

EXAMPLE 32

A 1 kg sample of fibre concentrate (second hydrocyclone underflow, similar to that of Example 16) was mixed by stirring with 3 liters of 4% "Matexil" WA-OT at ambient temperature. This suspension was passed three times through a high speed disc type colloid mill to effect fiberising. The resultant viscous slurry was split into five equal lots which were diluted to various extents with 0.25% "Matexil" WA-OT solution, as tabulated below. Each of these lots of diluted slurry was added to 50 liters of water by pumping through a fine jet. The coagulated fibre products thus formed were collected by passing through a 200 mesh screen, washing the solids with pressure sprays of water, and finally dewatering by filtration.

Each product was treated for flexural strength in asbestos cement plaques and Bauer McNett sizing, with the results shown below.

| First Dilution Liquid/solid Ratio | Flexural Strength kg/cm$^2$ | % Fibre in Plaques | Bauer McNett Sizing % | | |
|---|---|---|---|---|---|
| | | | +4 | +14 | −200 |
| 0 | 198 | 12.5 | 0.5 | 8.9 | 52.8 |
| 5 | 210 | 12.5 | 5.4 | 19.0 | 57.8 |
| 10 | 199 | 12.5 | 2.8 | 14.3 | 63.3 |
| 10 | 217 | 12.5 | 7.6 | 20.6 | 62.6 |
| 20 | 211 | 12.5 | 1.4 | 9.9 | 65.2 |

EXAMPLE 33

A sample (600 g) of low grade fibre (Group 7D type) produced in the conventional dry fiberising process was contacted at ambient temperature with 1500 ml of an aqueous solution containing 5% "Matexil" WA-OT and 0.5% dodecylbenzyene sulphonic acid. This suspension was passed twice through a colloid mill to induce fiberising and then diluted with 3 liters of 0.2% "Matexil" WA-OT solution. This mixture was subjected to centrifuging for sufficient time to remove all visually discernible suspended particles from the supernatent liquid, which was then separated from the residual solids. One liter of the opalescent supernatent liquid was diluted by pumping through a spray nozzle into 100 liters of water. Stringy fibre agglomerates were formed which were collected by centrifuging in a solid bowl centrifuge and finally dewatered by filtration. The dry weight of the collected solids was 43 g.

The fibre product was evaluated by measuring the flexural strength of asbestos cement plaques, which was 212 kg/cm$^2$ at 11.4% fibre content, and the Bauer McNett sizing, which showed 9.1% +4 mesh, 22.0% +14 mesh and 45.2% −200 mesh, thus demonstrating the formation of fibrous particles, having dimensions useful for reinforcing asbestos cement, from components of colloidal dimensions.

EXAMPLE 34

The remaining centrifuged supernatent liquid of Example 33 was recombined with the residue from the centrifuge by stirring, and the mixture passed through a colloid mill. This suspension was diluted with 8 liters of 2% "Matexil" WA-OT and then 2 liters of the mixture was extensively diluted as in Example 33. The agglomerated solids were collected as in Example 33.

Testing of the fibre product showed a flexural strength of asbestos cement plaques containing 11.0% fibre of 274 kg/cm$^2$ and a Bauer McNett sizing of 19.6% +4 mesh, 34.6% +14 mesh and 41.2% −200 mesh.

EXAMPLE 35

The solid from the first hydrocyclone underflow of Example 13 (400 g) was fiberised for 5 minutes in a high speed macerator in 1200 ml of 5% "Matexil" WA-OT at room temperature. This suspension was diluted with 4 liters of 0.2% "Matexil" WA-OT and cleaned of grit and specules by passing successively through an 18 mesh screen and then a hydrocyclone. The overflow stream from the hydrocyclone was extensively diluted by pumping through a spray nozzle into 60 liters of water. The coagulated suspension was further cleaned by passing through a hydrocyclone and the fibrous agglomerates collected in a centrifuge.

The yield of fibre product (dry basis) was 8.9% and the flexured strength of asbestos cement plaques containing 9.5% fibre was 159 kg/cm$^2$.

EXAMPLE 36

The solid from the second hydrocyclone underflow of Example 13 (500 g) was contacted with 1500 ml of 5% "Matexil" WA-OT heated to 70° C. This suspension was fiberised by passing three times through a high speed disc mill (100 micron gap between plates) and then diluted with 10 liters of 0.2% "Matexil" WA-OT. After settling to remove grit, the supernatent suspension was diluted by pumping through a jet into 100 liters of water. The suspension of fibrous agglomerates was classified by passing through a hydrocyclone and the product solids collected from the overflow in a centrifuge.

The yield of fibre product (dry basis) was 20% and the flexural strength of asbestos cement plaques containing 12.5% fibre was 279 kg/cm$^2$.

EXAMPLE 37

The solid from the centrifuge residue of Example 13 (200 g) was mixed at room temperature with 600 ml of 5% "Matexil" WA-OT solution, to which sufficient sulphuric acid was added to give an initial pH of 4. This mixture was fiberised for 2 minutes in a high speed macerater and the viscous product then diluted with 4 liters of 0.2% "Matexil" WA-OT, adjusted initially to pH 4. This suspension was diluted by adding slowly to 50 liters of water to bring about coagulation of the fibres. The fibrous agglomerates were separated in a solid bowl centrifuge and finally dewatered in a pressure filter (moisture content of cake was 65%).

The yield of fibre product (dry basis) was 59% and the flexural strength of asbestos cement plaques containing 11.0% fibre was 233 kg/cm$^2$.

EXAMPLE 38

The experiments described in Examples 35, 36 and 37 used as raw materials the three fractions derived from a particular sample of mill feed as described in Example 13.

This example compares the yield from these three experiments, calculated as a % of the original mill feed, with the yield obtained from a sample of the same mill feed by a conventional dry fiberising process. The total yield of fibre product, based on the mill feed, obtained using the particular variants of the process of the invention thus exemplified is as follows.

| | |
|---|---|
| Example 35 | 6.8% of mill feed |
| Example 36 | 3.4% of mill feed |
| Example 37 | 4.1% of mill feed |
| Total | 14.3% of mill feed |

This is to be compared with the yield of 6% fibre product indicated by tests in a commercial "core laboratory" using the dry fiberising process with the corresponding mill feed sample.

EXAMPLE 39

Samples of mill feed were added to solutions of the surfactants listed in the table below. The effectiveness of the surfactant solution in forming a dispersion was measured by the swelling of the pieces of mill feed after one hour contact with the solution. The effectiveness was assessed visually and the surfactant solutions ranked 1 to 10 on an increasing scale of effectiveness.

Similar solutions containing mill feed were prepared and subjected to shearing action in a vitamizer. The effectiveness of the solution in forming a dispersion under such shearing action was again assessed visually and the surfactant solutions ranked as before.

The results are recorded in the following table:

| | Ranking | |
|---|---|---|
| Surfactant | Standing undisturbed | Shearing action |
| Sodium oleate | 8 | 9 |
| Sodium stearate | 6 | 7–8 |
| Oleic acid | 7 | 8 |
| Sodium laurysulphate | 8 | 8 |
| Sodium dihexylsulphosuccinate | 6 | 6 |
| Sodium diamylsulphosuccinate | 8 | 7 |
| Sodium dioctylsulphosuccinate | 10 | |
| Disodium N-octadecyl sulphosuccinamate | 7 | 7 |
| Sodium dodecylbenzenesulphonate | 10 | |
| "Monfluor" 31 | 10 | |
| Sodium salt of sulphated nonylphenol | 7 | 7 |
| Dodecylbenzenesulphonic acid | 7 | 10 |
| "Dispersol" AC (naphthalene sulphonate) | 7 | 7 |
| "Alkanate" ND | 8 | 8 |
| Poly(12-hydroxystearic acid) | 8 | 8 |
| "Teric" 305 | 8 | |
| "Teric" 306 | 6 | |
| Polyethyleneglycol methacrylate | 6 | 6 |
| "Teric" 9A8 (ethoxylated fatty acid) | 6 | 6 |
| "Teric" 12A4 (ethoxylated fatty acid) | 8 | 6 |
| "Teric" PE64 | 6 | 6 |
| "Elvanol" 70-05 (polyvinyl alcohol) | 6 | 8 |
| "Gohsenol" NH-26 (polyvinyl alcohol | 6 | 9 |
| Calcium lignosulphonate | 8 | 8 |
| Dextrin | 8 | 8 |
| Tannin | 7 | 7 |
| "Monfluor" 51 (non-ionic) | 7 | 7 |
| "Teric" N8 (ethoxylated nonylphenol) | 6 | 7 |
| Glycol oleate | 9 | 8 |
| Glycol laurate | 9 | 8 |

| Surfactant | Ranking | |
|---|---|---|
| | Standing undisturbed | Shearing action |
| "Monfluor" 71 (cationic) | 8 | 8 |
| "Vantoc" CL | 7 | 8 |
| "Centrimide" | 8 | 8 |
| "Calgon" | 6 | 7 |
| Sodium tripolyphosphate | 7 | 7 |

("Dispersol", "Alkanate", "Elvanol", "Gohsenol" and "Calgon" are Registered Trade Marks).

EXAMPLE 40

A solution (1 liter) of "Vantoc" CL (5%) was heated to 90° C. To this solution was added mill feed (1 kg) and the mixture kept at 90° C. for two hours. The mixture was then ball milled for twenty minutes. The resultant flocculated gel was then dewatered by filtering and the fibre was mixed with water and pumped through a hydrocyclone. The overflow was collected and dewatered in a pressure filter. A portion of the fibre product was then oven dried; a yield of 13.8% of good quality fibre was obtained.

EXAMPLE 41

A sample of dispersed fibres prepared as described in Example 25 was introduced into a pipe through which water was flowing at the rate of 6 liters/min. The dispersion was sprayed into the water in the direction of water flow at a rate of 0.5 liter/min. The agglomerated slurry was sampled at a point beyond the area of turbulence and the sample allowed to stand. Settling of the fibre product was fairly rapid, and the supernatant was about two-thirds of the total volume after 10 minutes standing.

EXAMPLE 42

The procedure of Example 41 was repeated except that the dispersed fibre sample was not sprayed into the flowing water, but entered the pipe at the same point as the water. The area of turbulence was substantially reduced compared with that of Example 41, and the final slurry settled at about four times the rate. The volume of supernatant was five-sixth of the total volume.

EXAMPLE 43

A fibre concentrate (670 g) was added to a 5% solution of "Matexil" WA-OT (2000 ml), preheated to 90° C., and the mixture fiberised for a short time in a high speed macerator in several batches. The resultant recombined slurry was diluted with 13.5 liter of 0.25% "Matexil" WA-OT and split into six indentical parts, each of which was diluted to agglomerate the fibres by adding to 20 liters of water in different ways. The coagulated products were each collected using a centrifuge.

Five of the coagulation stage experiments were carried out with different combinations of pumps linked with various sprays and jets. In a sixth case the fibre dispersion was dumped rapidly into the dilution water. All of the methods showed good flexural strength values for asbestos cement plaques, and similar Bauer-McNett sizing characteristics, and were better in both respects than the fibre concentrate used as raw material. The results are recorded below.

Pump (A) was of conventional impeller drive, while pump (B) was of peristaltic design to provide a gentle pulsating flow. Jet (1) produced a fan-shaped stream and jet (2) was a length of rubber tubing that could be directed to various parts of the slurry. Spray (2) was a device giving a multiplicity of fine spray jets radiating from a common point, and spray (6) differed in that the fine spray jets were essentially parallel to one another.

| Dilution Method | Flexural Strength kg/cm$^2$ | % Fibre in Plaques | Bauer McNett Sizing % | | |
|---|---|---|---|---|---|
| | | | +4 | +14 | −200 |
| Pump (A), Jet (1) | 307 | 11.0 | 38.4 | 46.1 | 41.2 |
| Pump (A), Spray (a) | 297 | 11.0 | 40.9 | 48.7 | 38.7 |
| Pump (B), Spray (b) | 266 | 11.0 | 44.0 | 49.8 | 38.1 |
| Pump (B), Spray (a) | 294 | 11.0 | 43.7 | 51.7 | 36.9 |
| Pump (B), Jet (2) | 316 | 11.0 | 38.2 | 46.3 | 43.0 |
| Dumped | 276 | 11.0 | 34.1 | 43.0 | 40.8 |
| Fibre Concentrate | 286 | 17.4 | 1.4 | 4.1 | 72.0 |

EXAMPLE 44

A sample (27 kg) of fibre prepared according to the procedure of Example 25 was suspended in water (20 liters) containing calcium hydroxide (400 g) and sodium hydroxide (400 g), and the suspension maintained at 40° C. for 10 hours. The fibres were recovered by filtration and dried.

A cementitious composition was prepared containing Portland cement, silica, and water in a commercial asbestos-cement plant. The treated fibre had a hydrophilic surface and there was no flotation of fibre in the slurry, and frothing was insignificant. The cured composition had good flexural strength.

EXAMPLE 45

A sample (27 kg) of fibre prepared according to the procedure of Example 25 was heated in an oven maintained at 300° C. for 6.5 hours. A cementitious composition was prepared from the product fibre by the procedure described in Example 44. There was no trace of frothing or flotation of fibres in the slurry, and the cured cementitious composition had excellent flexural strength.

We claim:

1. Cementitious compositions containing hydraulic cement and novel asbestos fibres characterized in that the said asbestos fibres have surfactant thereon and are derived from asbestos-bearing material by a process which comprises firstly treating said asbestos-bearing material with a surfactant adsorbable on or reactable with said asbestos fibre to form a dispersion and secondly agglomerating said dispersion.

2. Cementitious compositions according to claim 1 wherein in the said process the said chemical agent comprises a surfactant selected from the group consisting of anionic, non-ionic, cationic, and amphoteric surfactants.

3. Cementitious compositions according to claim 2 wherein in the said process the said anionic surfactant is selected from the group consisting of carboxylates, N-acylsarcosinates, alkanesulphonates, linear and branched alkylarylsulphonates, dialkyl sulphosuccinates, arylsulphonates, naphthalenesulphonates, N-acyl-N-alkyllaurates, 2-sulphoethyl esters of fatty acids, olefin sulphonates, alkyl sulphates, sulphated natural oils, sulphated alkylphenol alkoxylates, and phosphate esters of alkanols and phenol and alkylphenol alkoxylates, wherein the said alkyl groups are selected from the group consisting of nonyl, decyl, dodecyl, tridecyl, stearyl, cetyl, palmityl and myristyl.

4. Cementitious compositions according to claim 3 wherein in the said process the dialkyl sulphosuccinates are selected from the group consisting of sodium dihexyl sulphosuccinate, sodium di(isobutyl)sulphosuccinate, sodium dioctylsulphosuccinate, magnesium dioctylsulphosuccinate, disodium N-octadecylsulphosuccinamate, tetrasodium N-(1,2-dicarbethoxyethyl)-N-octadecyl sulphosuccinate, and the sodium sulphosuccinate esters of lauric mono- and di-ethanolamides or of ethoxylated lauryl or decyl alcohols and wherein the alkyarylsulphonates are selected from the group consisting of dodecylbenzenesulphonic acids and derivatives thereof.

5. Cementitious compositions according to claim 2 wherein in the said process the said nonionic surfactant is selected from the group consisting of fatty acid esters, alkoxylated aliphatic alcohols and alkylphenols, alkoxylates, fatty acids and fatty acid amides, and natural fats and oils, wherein the aliphatic alcohols are selected from the group consisting of ethylene glycol, propylene glycol, glycerol, diethylene glycol, oleyl alcohol, lauryl alcohol, cetyl alcohol, steary alcohol, tridecyl alcohol, myristyl alcohol, trimethylnonyl alcohol, primary $C_{12}$–$C_{13}$ and $C_{12}$–$C_{15}$ alcohols, secondary $C_{11}$–$C_{15}$ alchols, tallow, sorbitan, and polyethylene glycol, the alkylphenols are selected from the group consisting of nonylphenol, dodecylphenol, octylphenol, isooctylphenol, and $C_8$–$C_{12}$-alkyl-phenols, and the fatty acids are selected from the group consisting of lauric acid, stearic acid, oleic acid, coco acid, capric acid and myristic acid, ricinoleic acid, and acids derived from tall oil, soybean oil, rosin, tallow, lard, cottonseed, and safflower oil.

6. Cementitious compositions according to claim 5 wherein in the said process the alkoxylates are ethoxylates containing from 1 to 50 ethyleneoxy (—CH$_2$CH$_2$—O—) units per molecule.

7. Cementitious compositions according to claim 2 wherein in the said process the said cationic surfactant is selected from the group consisting of aliphatic mono-, di-, and poly-amines, amine salts, amine oxides of the general formula

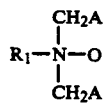

wherein A is hydrogen or hydroxyl, and $_1$ is selected from the group consisting of cetyl, lauryl, myristyl, stearyl, coco, decyl, hexadecyl and octadecyl, and alkoxylates of alkyl and alicyclic amines, 2-alkyl-1-(hydroxyethyl)-2-imidazolines, tetrakis-substituted ethylenediamines, amide-linked amines of the general formula

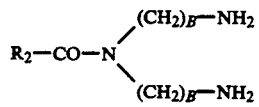

wherein R$_2$—CO—N is derived from the group consisting of coconut, oleic, stearic, and tall oil acids, and B is 2 or 3, and quaternary ammonium salts.

8. Cementitious compositions according to claim 7 wherein in the said process the alkoxylates of alkyl and alicyclic amines are ethoxylates of amines selected from the group consisting of coco-amine, soya-amine, tallow-amine, stearylamine, and resin.

9. Cementitious compositions according to claim 7 wherein in the said process the quaternary ammonium salts are selected from the group consisting of dialkyldimethylammonium salts, alkylbenzyl dimethylammonium salts, alkyltrimethylammonium salts, benzyltrimethylammonium salts, and alkylpyridinium salts, wherein the alkyl is selected from the group consisting of coco, tallow, soya, stearyl, cetyl, lauryl, and myristyl.

10. Cementitious compositions according to claim 2 wherein in the said process and said amphoteric surfactant is selected from the group consisting of N-coco-3-aminopropionic acid, disodium N-lauryl-3-iminodipropionate, N-carboxymethyl-N-cocoalkyl-N,N,dimethylammonium hydroxide, the sodium salt of N-hydroxyethyl-N-lauromido-β-alanine, and substituted 2-imidazolinium hydroxides.

11. Cementitious compositions according to claim 1 wherein in the said process the said dispersion comprises an aqueous medium wherein the weight ratio of water to solids in the dispersion is in the range from 1:2 to 20:1.

12. Cementitious compositions according to claim 11 wherein in the said process the said weight ratio of water to solids is in the range from 3:2 to 6:1.

13. Cementitious compositions according to claim 11 wherein in the said process the surfactant concentration in the aqueous dispersion is above 0.01% w/w.

14. Cementitious compositions according to claim 13 wherein in the said process the surfactant, concentration in the aqueous dispersion is above 1% w/w.

15. Cementitious compositions according to claim 1 wherein in the said process the temperature of the said dispersion is in the range from 50° to 200° C.

16. Cementitious compositions according to claim 1 wherein in the said process the said dispersion is subjected to mechanical agitation prior to agglomeration.

17. Cementitious compositions according to claim 1 wherein in the said process the dispersion is agglomerated by addition of a diluent.

18. Cementitious compositions according to claim 17 wherein in the said process the said diluent is an aqueous medium.

19. Cementitious compositions according to claim 17 wherein in the said process the diluent contains a polymeric flocculating agent.

20. Cementitious compositions according to claim 17 wherein in the said process the weight ratio of diluent to dispersion is in the range from 20:1 to 1500:1.

21. Cementitious compositions according to claim 20 wherein in the said process the said weight ratio of diluent to dispersion is in the range from 70:1 to 400:1.

22. Cementitious compositions according to claim 1 wherein the said novel asbestos fibres are in the form of stringy agglomerates containing up to 20% w/w of a surfactant as hereinbefore defined in claims 2 to 10.

23. Cementitious compositions according to claim 22 wherein the said stringy agglomerates contain up to 10% of a surfactant as hereinbefore defined in claims 2 to 10.

24. Cementitious compositions according to claim 1 wherein the said novel asbestos fibres are contacted with an alkaline medium prior to incorporation in said compositions.

25. Cementitious compositions according to claim 24 wherein the said alkaline medium is an aqueous medium comprising an alkali selected from the group consisting of alkali metal hydroxides and alkaline earth metal hydroxides.

26. Cementitious compositions according to claim 1 wherein the said novel asbestos fibres are subjected to heating to a temperature in the range of 140° to 350° C. prior to incorporation in said compositions.

27. Cementitious compositions according to claim 26 wherein in the said heating the temperature is in the range from 150°–200° C.

28. Cementitious compositions according to claim 1 wherein in the process the said asbestos-bearing material is chrysotile.

29. A process of preparing the cementitious compositions of claim 1 which process comprises the steps of firstly, treating asbestos-bearing material with an aqueous medium containing a surfactant to form a dispersion, secondly, agglomerating said dispersion by addition of a diluent optionally containing a polymeric flocculating agent, and thirdly, adding hydraulic cement.

30. A process according to claim 29 wherein the said asbestos-bearing material is low grade short fibre.

31. A process according to claim 29 wherein the said asbestos-bearing material is selected from the group consisting of crude ore, fibre concentrates from dry and wet processes, mine wastes and tailings, and wherein one or more classifying steps are used to remove grit and undispersed fibre.

32. A process according to claim 29 wherein the said surfactant comprises sodium dioctylsulphosuccinate.

33. A process according to claim 29 wherein the surfactant comprises a dodecylbenzenesulphonate.

34. A process according to claim 29 wherein the surfactant comprises an ethoxylated amine or salt thereof.

35. Asbestos-cement articles prepared from the compositions of claim 1 by filtration of the said composition.

36. Asbestos-cement articles prepared from the compositions of claim 1 by extrusion of the said composition.

37. A process according to claim 29 wherein the asbestos-bearing material is chrysotile and the process includes the following steps:
   (1) a crushing step to convert the asbestos-bearing material to mill feed,
   (2) a wet screening and gravity separation step to remove large grit typically larger than 10 mesh containing little asbestos,
   (3) a wet grinding or crushing step to liberate and partially open the asbestos fibre bundles,
   (4) a first classification step to produce a fibrous concentrate from which particles of non-fibrous components have been substantially removed,
   (5) a dewatering step,
   (6) a contacting step where the partially-opened fibre bundles are treated with the surfactant,
   (7) a fiberising step,
   (8) a dilution step, to reduce slurry viscosity
   (9) a second classification step to further remove unwanted grit,
   (10) a slurry dilution step to induce coagulation of fibres and form stringy fibre agglomerates,
   (11) a third classification step to remove residual particles of unfiberised materials and some of the shortest fibres, if required, and
   (12) a dewatering step.

* * * * *